United States Patent [19]

Skypala

[11] 4,318,350

[45] Mar. 9, 1982

[54] OVERHEAD WIRING ARRANGEMENT FOR A RAILWAY CAR

[75] Inventor: Louis M. Skypala, Oreland, Pa.

[73] Assignee: The Budd Company, Troy, Mich.

[21] Appl. No.: 99,856

[22] Filed: Dec. 3, 1979

[51] Int. Cl.³ .............................................. B61D 17/00
[52] U.S. Cl. ................................................... 105/397
[58] Field of Search ................... 105/397, 329 R, 334, 105/377

[56] References Cited

U.S. PATENT DOCUMENTS 2,264,637 12/1941 Landell .......................... 105/329 R
2,595,212 4/1952 Ledwinka et al. .................. 105/397
2,719,489 10/1955 Dean .................................. 105/397

Primary Examiner—Richard A. Bertsch
Attorney, Agent, or Firm—A. L. Trueax, Jr.

[57] ABSTRACT

An overhead wiring arrangement for a railway car includes an enclosed raceway attached to the main roof. The raceway includes a plurality of wires to be distributed to different locations in the car. Some of the wires are then diverted in different paths to different locations down into the interior of the car. Some of the wires pass through the raceway for connection to a flexible cable leading to a next adjacent car.

10 Claims, 7 Drawing Figures

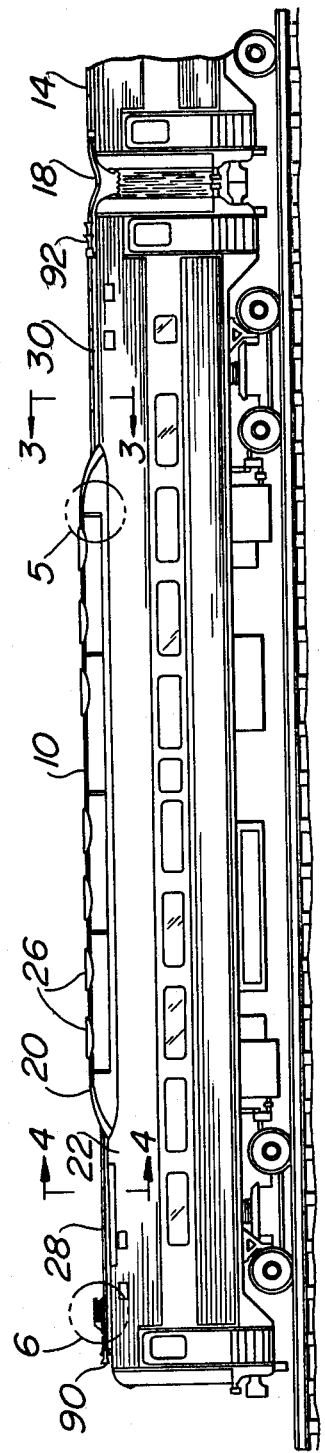

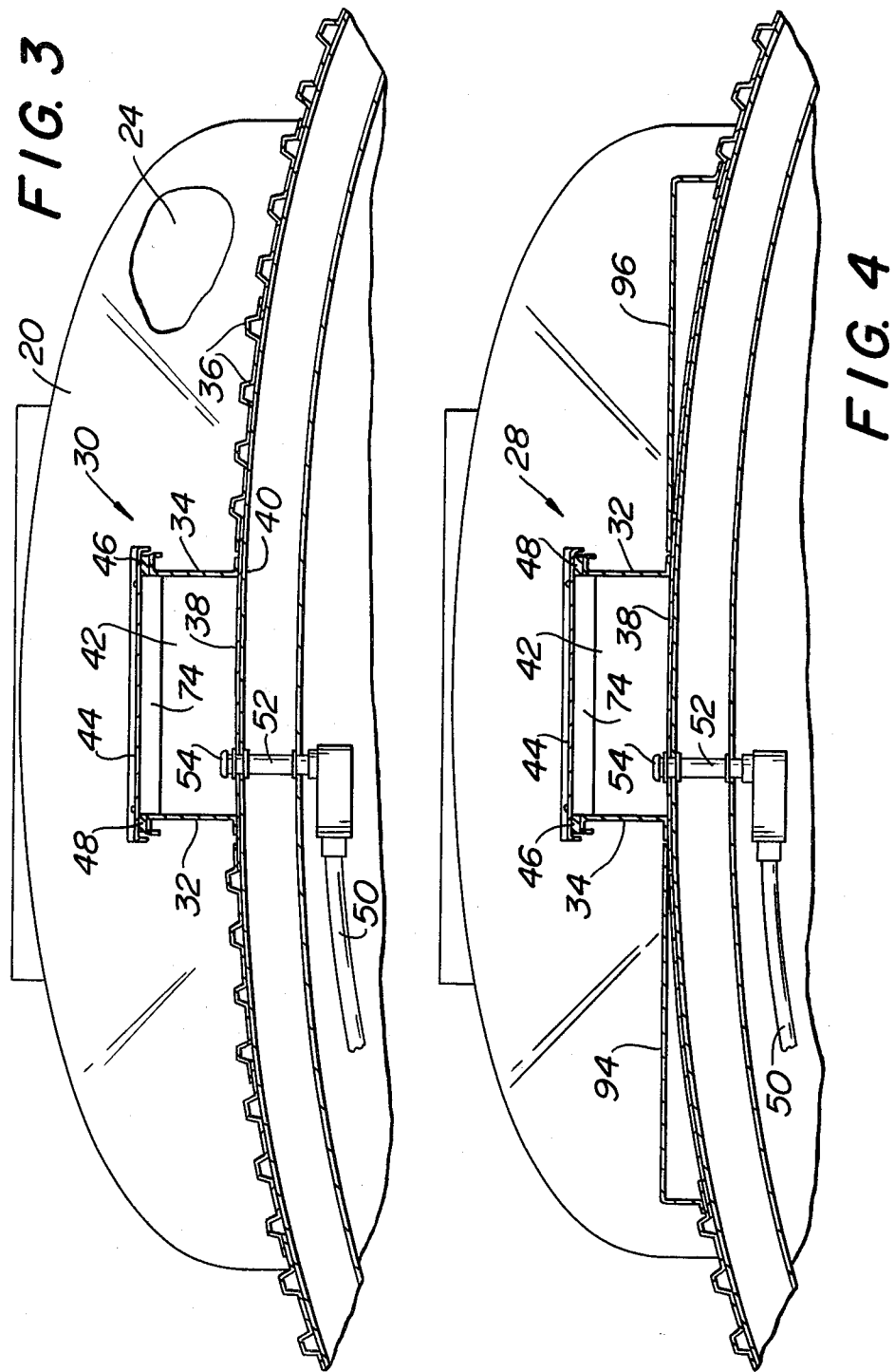

OVERHEAD WIRING ARRANGEMENT FOR A RAILWAY CAR

BACKGROUND OF THE INVENTION

1. Field of the Invention

In most conventional trains involving connections between cars, the wires for the electrical and communication systems are disposed below the car. Generally, they are slightly below the floor area about the level of the coupler between the cars. When the wires from one car are to be connected to wires of an adjacent car, they are generally passed below the floor level of the car.

2. Prior Art

In the past, overhead ducts have on rare occasions been used to house wires in a railway car. In general, these overhead ducts have extended along the entire length of the car and were not used to drop down to be connected inside the interior of the car. When such wires of the cars had to be interconnected to adjacent cars, vertical ducts had to be used to take the wires down from the roof to a lower level where the interconnections between the cars were made.

Many modern cars demand a very large number of wires to accommodate various communication systems which may be used for television, radio, security and various other functions not found in many older cars. In some of the modern systems, as many as two hundred or more wires may have to be connected between cars. Because the wiring systems below the floor area of most conventional cars are already overcrowded, it is virtually impossible to put additional wires below the car efficiently.

Some of the recently built modern cars have auxiliary or secondary roofs which are mounted to the main roof of the car. The auxiliary roof and the main roof provide an enclosure for various types of equipment such as heating and cooling equipment. In many cases, exhaust fans, cooling fans and the like are included in the enclosed area. Because of the auxiliary roof and obstructing equipment, it is impossible to use a unitary raceway or duct which extends from one end of the car to the other to carry wires. The various equipment in the enclosed area between the auxiliary roof and the main roof makes it necessary to provide means to connect the wires at one end of the car into the auxiliary roof and then distribute them in appropriate places around the equipment inside the enclosed area between the auxiliary and main roofs. Finally the wires have to pass from the auxiliary roof to the other end of the car where, in many cases, they must be connected to the next car.

OBJECTS OF THE INVENTION

It is an object of this invention to provide an improved overhead wiring system for running electrical wires through and between railway cars.

It is a further object of this invention to provide an improved overhead wiring system for a railway car for use in the interior of the car.

It is still a further object of this invention to provide an improved overall wiring system for a railway car with means to gain ready access to the wires at different points along the car to permit the wires to be dropped into the interior of the car at selected locations.

It is still a further object of this invention to provide improved means for connecting external antennae and other electrical equipment at different positions along the roof of a railway car.

BRIEF SUMMARY OF THE INVENTION

In accordance with the present invention, an overhead wiring arrangement includes an elongated raceway secured to the roof of a railway car for receiving a plurality of wires therein. A plurality of connectors are provided at the ends of the raceway to permit different wires to be distributed and dropped down into selected areas inside of the car. The raceway may include overhead connector means to permit connection to the next adjacent car. The raceway includes a plurality of detachable plates to permit access to the wires at different locations. An antenna is secured to one of the plates.

Other objects and advantages of the present invention will be apparent and suggest themselves to those skilled in the art, from a reading of the following specification and claims, taken in conjunction with the accompanying drawings.

BRIEF DESCRIPTION OF THE DRAWINGS

FIG. 1 is a side view of interconnected railway cars illustrating an overhead wiring system, in accordance with the present invention;

FIG. 2 is a top view of the railway cars illustrated in FIG. 1;

FIG. 3 is a cross-sectional view taken along line 3—3 of FIG. 1;

FIG. 4 is a cross-sectional view taken along lines 4—4 of FIG. 1;

DESCRIPTION OF THE INVENTION

Figure 5:
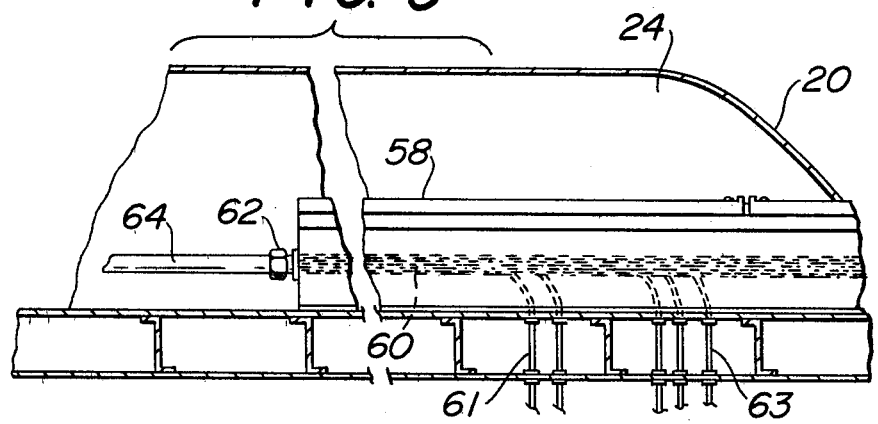
FIG. 5 is an enlarged view of a portion illustrated with the circle 5 of FIG. 1.

The present invention will be described in connection with a recent modern railway car which includes an auxiliary roof and may require interconnections to a next adjacent car. In some cars, there may not be such auxiliary roofs.

Referring to FIGS. 1 and 2, a railway car 10 includes an overhead wiring system connected to an adjacent car 14 through a cable 18. The various components below the car, including the trucks and various electrical equipment are not described in detail because they are well known and are only incidental to the present invention. The present invention is primarily directed to the overhead electrical system associated with the roof of the cars 10 and 14. Only the overhead wiring system associated with the lead car 10 will be described in detail, it being understood that similar overhead arrangements may be associated with the car 14 and any other additional cars. It is recognized, of course, that the lead and last cars in a train will have only one interconnecting cable whereas the cars between the end cars will have two interconnecting cables, i.e., one at each end of the car.

The car 10 includes an auxiliary roof 20 and a main corrugated roof 22. An enclosed area 24 is provided between the auxiliary roof 20 and the main roof 22. This enclosed area is used to accommodate various types of equipment within the car such as heating and cooling equipment. In the illustrated embodiment a plurality of electrical fans 26 are provided within the enclosure 24.

As illustrated in FIGS. 3 to 7, along with FIGS. 1 and 2, closed raceways 28 and 30 are provided toward both ends of the car on both sides of the auxiliary roof 20. The raceways 28 and 30 are secured to the main roof of the car and are disposed longitudinally extending from the ends of the car through the ends of the auxiliary roof 20 and into the interior of the enclosed area 24.

As illustrated in FIG. 3, the raceway 28 includes a pair of channel members 32 and 34 which provide the sides for the raceway 28. Corrugations 36, normally forming part of the main roof are taken out or omitted on the roof in the area at which the raceway 28 is to be placed.

A bottom plate 38 is secured to the main roof panel 40. Channels 32 and 34 are secured to the bottom plate 38 by welding or any other suitable means. A pair of end plates are secured to the end opening of the raceway 30, with only the end plate 42 being illustrated in FIG. 3. A top cover 44 is secured to the tops of the channel members 32 and 34. Gaskets 46 and 48 are provided between the top cover 44 and the channel members 34 and 32, respectively. A conduit 50 leading to the interior of the car is connected through a tubing 52 to a connector 54 within the enclosure of the raceway 28. Various wire connections within the raceway may be connected to the connector 54. These wires may comprise conduits for communication, for receiving radio signals or the like.

Figure 7:
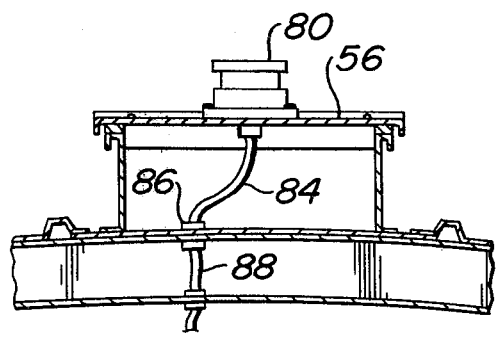
FIG. 7 is a cross-sectional view taken along lines 7—7 of FIG. 6.

As illustrated in FIGS. 2 and 7, the top cover 44 may comprise a plurality of pieces 56. If the raceway 28, for example, is approximately 21 feet long, the individual pieces 56 may be in lengths of 3 feet. Forming the cover 44 in segments 56 makes it possible to gain ready access to the wires within the raceway without disturbing the entire top cover. Thus wires may be connected to the interior of the car at different locations by removing a selected one of the panels which is located in the proper location.

FIG. 5 illustrates the raceway 30 having one end 58 extending through the auxiliary roof 20 into the enclosed area 24. Some of the plurality of wires 60 within the raceway 30 are connected to a connector means 62. The connector means 62 may comprise a conventional plug and socket arrangement. A conduit 64 is connected to the connector means 62 which extends further into the interior of the enclosure 24. Some of the wires 61 and 63 may be dropped from the interior of the raceway 30 into selected areas of the interior of the car.

More than a single connector means 62 and more than a single conduit 64 may be connected to the ends of the raceway 30. The plurality of connector means and conduits makes it possible to provide divergent paths whereby selected wires may be connected down into the interior of the car at different locations. In some respects, the raceways may be considered as large junction boxes on the roof of the car to provide connections and distribution for a large number of conductors. As illustrated in FIG. 2, conduits 66, 68 and 67, 69 are connected to extend in different paths and directed along the sides of the fans 26 or around other electrical equipment which may form obstacles for the cables.

Figure 6:
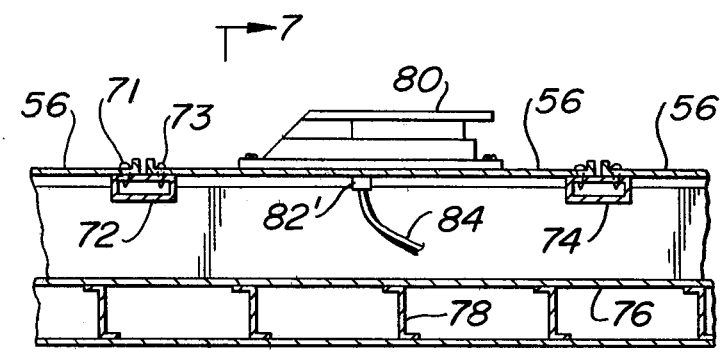
FIG. 6 is an enlarged view illustrating some details relating to the item in circle 6 of FIG. 1.

FIG. 6 illustrates the various sections or plates 56 of the cover 44 connected to tubular connectors 72 and 74 which extend between the channel members 32 and 34 (FIG. 3). The plates 56 may be connected to the tubular members 72 and 74 by means of screws 71 and 73. The use of tubular members in addition to providing strength, prevent the sharp points of the screws from extending into the enclosure of the raceway where they may contact the wires therein.

The bottom roof panel 76 is supported by beams 78. A two-way FM radio antenna 80, for example, may be connected to one of the panels 56. The aerial or antenna 80 may be completely pre-assembled and may be one of any one of the panels 56 and may be placed in any selected location along the raceway. The antenna 80 may be connected to a connector 82 which in turn is connected to a conduit 84. The conduit 84 is connected to another connector 86 which in turn leads to a conduit 88 (FIG. 7) which goes to the interior of the car which may be a radio within the particular car.

While an antenna has been illustrated, it is apparent that various other types of equipment could be pre-assembled on any one of the selected panels. The various wires within the raceway may be connected to items such as horns 90 and 92. Antenna pads or platforms 94 and 96 are provided on the roof of the car and normally only provided on the first car. This permits workmen to stand and work at selected points in the raceway. Equipment may also be put on these platforms.

The arrangement illustrated provides interconnection between cars while still allowing the cars to negotiate curves and cross-overs. This is made possible because of the flexible interconnecting cables between cars.

What is claimed is:

1. An overhead wiring system for a railway car having a roof and interior compartments therebelow comprising:
    (a) an elongated raceway positioned on the outer surface of said roof and having a plurality of electrical conductors therein;
    (b) means for securing said raceway longitudinally on the outer surface of said roof of said car, and
    (c) means for connecting selected ones of said electrical conductors from said raceway into at least one of said compartments below said roof.

2. An overhead wiring system as set forth in claim 1 wherein said raceway includes a pair of side channel members spaced from each other and secured to said roof, and a top cover secured to said channel member opposite said roof for cooperating with said roof and said channel members for forming said elongated raceway.

3. An overhead wiring system as set forth in claim 2 wherein said cover comprises a plurality of detachable plates attached to said channel members to permit removal of selected ones thereof to permit access to the wires at selected locations within said raceway.

4. An overhead wiring system as set forth in claim 3 wherein end members are provided on said raceway and connector means provided thereon, with one of said connector means adapted to be connected to an overhead flexible cable leading to conductors in a next adjacent railway car.

5. An overhead wiring system as set forth in claim 4 wherein an auxiliary roof is provided on the roof of said railway car to provide an enclosed area therebetween and said raceway extends from one end of said car into said enclosed area.

6. An overhead wiring system as set forth in claim 5 wherein a pair of raceways extend from the ends of said railway car into opposite ends of said auxiliary roof into said enclosed area.

7. An overhead wiring system as set forth in claim 6 wherein an antenna is mounted to one of said plates and electrical connectors connect said antenna through the main roof into the interior of said railway car.

8. An overhead wiring system as set forth in claim 7 wherein said enclosed area includes a plurality of fans and said wires are connected between the conductor means at both ends of said raceway with some of the wires being diverted along opposite sides of said fans.

9. An overhead wiring system as set forth in claim 8 wherein work platforms are provided on said main roof along the sides of one of said raceways.

10. An overhead wiring system as set forth in claim 9 wherein cross tubular members are connected to said channel members to support the plates of said cover and to receive securing means therein.

* * * * *